United States Patent
Mansour

(10) Patent No.: US 10,640,125 B2
(45) Date of Patent: May 5, 2020

(54) INCLEMENT WEATHER VEHICLE SYSTEM

(71) Applicant: Ford Global Technologies, LLC, Dearborn, MI (US)

(72) Inventor: Robert Emad Mansour, Madison Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 231 days.

(21) Appl. No.: 15/710,547

(22) Filed: Sep. 20, 2017

(65) Prior Publication Data

US 2019/0084583 A1    Mar. 21, 2019

(51) Int. Cl.
*B60W 50/14*    (2020.01)
*B60W 40/06*    (2012.01)
*B60W 40/09*    (2012.01)

(52) U.S. Cl.
CPC ............ *B60W 50/14* (2013.01); *B60W 40/06* (2013.01); *B60W 40/09* (2013.01); *B60W 2050/146* (2013.01); *B60W 2550/12* (2013.01); *B60W 2550/14* (2013.01); *B60W 2550/402* (2013.01)

(58) Field of Classification Search
CPC .. B60W 50/14; B60W 40/09; B60W 2550/14; B60W 2550/12; B60W 2050/146; B60W 2550/402; B60W 40/06; B60W 30/182; B60W 50/0097; B60W 30/146; B60W 40/00; B60W 30/18; G06Q 10/0635; Y04S 10/54; G01C 21/3407; G01C 21/3415; G01C 21/343; G01C 21/3469; G01C 21/3492; G01C 21/3605; G01C 21/3691; G05D 1/0027; G05D 1/0214; G05D 1/0217; G05D 1/0223; G05D 1/0291; G08G 1/096816; G08G 1/096822; G08G 1/096844; G08G 1/202
See application file for complete search history.

(56) References Cited

U.S. PATENT DOCUMENTS

| | | | |
|---|---|---|---|
| 2006/0167784 A1* | 7/2006 | Hoffberg | G06Q 20/401 705/37 |
| 2007/0288131 A1* | 12/2007 | Yakes | B60K 6/46 701/22 |
| 2011/0077028 A1 | 3/2011 | Wilkes, III et al. | |
| 2017/0028912 A1 | 2/2017 | Yang et al. | |
| 2018/0059687 A1* | 3/2018 | Hayes | G01C 21/3415 |

* cited by examiner

*Primary Examiner* — Nga X Nguyen
(74) *Attorney, Agent, or Firm* — Michael Spenner; Brooks Kushman, P.C.

(57) ABSTRACT

A vehicle includes a traction control system. The vehicle includes a controller configured to indicate, on a display, a recommended speed based on a precipitous deposit, a temperature, and a speed limit, and activate the traction control system before the vehicle crosses the vector. The indication and activation may be responsive to an expected route of the vehicle crossing the expected precipitous deposit of a weather prediction vector received from a source offboard the vehicle.

16 Claims, 4 Drawing Sheets

INCLEMENT WEATHER VEHICLE SYSTEM

TECHNICAL FIELD

The present disclosure relates to inclement weather systems in vehicles.

BACKGROUND

Routing and navigation systems provide directional information to vehicle occupants. These systems may provide speed restrictions or traffic indications along the route. Vehicles may further encounter inclement weather. The occupants may be unaware of the weather conditions along their predetermined route.

SUMMARY

A vehicle includes a traction control system. The vehicle includes a controller configured to indicate, on a display, a recommended speed based on a precipitous deposit, a temperature, and a speed limit and activate the traction controls before the vehicle crosses the vector. The indication and activation may be responsive to an expected route of the vehicle crossing the expected precipitous deposit of a weather prediction vector received from a source offboard the vehicle.

A method includes indicating on a display a recommended speed based on a deposit, a temperature, and a speed limit. The indication may be responsive to an expected route of the vehicle crossing the expected precipitous deposit of a weather prediction vector received from a source offboard the vehicle. The method includes activating a traction control system before the vehicle crosses the vector. The method may be performed by a controller.

A vehicle includes a controller configured to indicate, on a display, a driving suggestion based on a precipitous deposit, a temperature, and a speed limit. The indication and activation may be responsive to an expected route of the vehicle crossing the expected precipitous deposit of a weather prediction perimeter received from a source offboard the vehicle.

DETAILED DESCRIPTION

Figure 1:
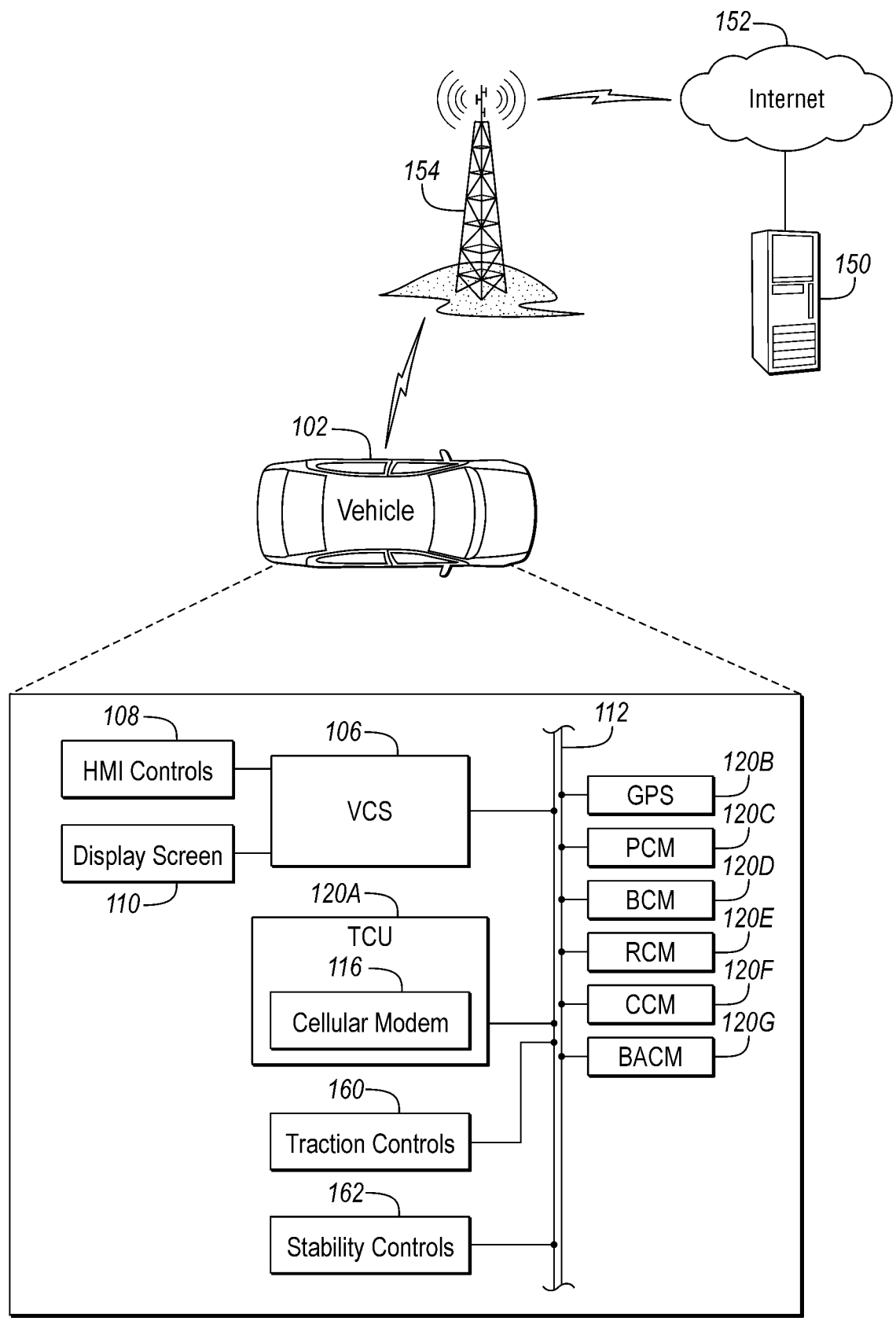
FIG. 1 is an overview of a vehicle telematics and control system.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle navigation system may be configured to receive weather information that is proximate to a travel path of the vehicle. The weather information may be in the form of vectors having an estimated time component, a starting coordinate, a direction of travel, and a rate of travel. The vectors may form an object defined by an area or volume. The vector may be associated with a weather pattern or segment of a weather pattern having an expected precipitous deposit. For example, a weather pattern may have distinct elements expected to produce rain. Each distinct element may have an associated weather prediction vector. The weather prediction vector may have an originating coordinate and a predicted travel path over time. The vector may include anticipated rates of precipitation, displacement velocities, temperature, and other information.

If the travel path and vector cross, a controller may be configured to display weather information on a display or navigation screen for the passengers. For example, icons may be associated with the cross or intersection that may indicate the location of the crossing on the intended vehicle route. The display may include estimations of accumulated precipitation. For example, colors may be used to indicate the type of precipitation and line thickness may be used to indicate the amount of precipitation. Additionally, the controller may display a suggest speed based on a mapped speed limit for the portion of the route and the amount of precipitation. For example, the precipitation amount may be two inches and the speed limit for the given portion of the route is 55-mph. The amount could also include rainfall intensities, ice accumulation, or any type of precipitous deposit. The controller may recommend a travel speed below the speed limit based on the precipitation. The recommendation may be further based on the expected temperature of the precipitation. For example, the vector may include temperature characteristics that further alter the speed suggestion. The 55-mph speed limit may be reduced by 20% based on the presence of rain to 44-mph. The temperature may further reduce the 55-mph speed limit by 60% to 22-mph. The display may also include driving tips (e.g., turn on traction control, brake gently, decelerate, reduce speed, avoid sudden maneuvers, approaching hill, take foot off accelerator pedal, heavy rain, wet payment, icy pavement).

FIG. 1 illustrates an example vehicle 102 implementing controllers to communicate with a remote server 150. The vehicle 102 may include a vehicle computing system (VCS) 106 configured to communicate using a telematics control unit (TCU) 120-A over a wide-area network 152 (e.g., cellular, Wi-Fi, SRC, IEEE 802.11p, VANET) using a cellular modem 116. The system also includes a vehicle data server 150 configured to send, compute, and otherwise produce weather prediction vectors, vehicle routes, and precipitative deposits. While an example system is shown in FIG. 1, the example components as illustrated are not intended to be limiting. Indeed, the system may have more or fewer components, and additional or alternative components and/or implementations may be used. Some functions may be performed by the vehicle, the server, or a combination thereof.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The VCS 106 may be configured to support voice command and BLUETOOTH interfaces with the driver and driver carry-on devices, receive user input via various buttons or other controls, and provide vehicle status information to a driver or other vehicle 102 occupants. An example VCS 106 may be the SYNC system provided by FORD MOTOR COMPANY of Dearborn, Mich.

The VCS 106 may further include various types of computing apparatus in support of performance of the functions of the VCS 106 described herein. In an example, the VCS 106 may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, a processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C #, Fortran, Pascal, Visual Basic, Python, Java Script, Perl, PL/SQL, etc.

The VCS 106 may also receive input from human-machine interface (HMI) controls 108 configured to provide for occupant interaction with the vehicle 102. For instance, the VCS 106 may interface with one or more buttons or other HMI controls 108 configured to invoke functions on the VCS 106 (e.g., steering wheel audio buttons, a push-to-talk button, instrument panel controls, etc.). The VCS 106 may also drive or otherwise communicate with one or more displays 110 configured to provide visual output to vehicle occupants, e.g., by way of a video controller. In some cases, the display 110 may be a touch screen further configured to receive user touch input via the video controller, while in other cases the display 110 may be a display only, without touch input capabilities. In an example, the display 110 may be a head unit display included in a center console area of the vehicle 102 cabin. In another example, the display 110 may be a screen of a gauge cluster of the vehicle 102.

The VCS 106 may be further configured to communicate with other components of the vehicle 102 via one or more in-vehicle networks 112 or vehicle buses 112. The in-vehicle networks 112 may include one or more of a vehicle controller area network (CAN), an Ethernet network, and a media oriented system transfer (MOST), as some examples. The in-vehicle networks 112 may allow the VCS 106 to communicate with other vehicle 102 systems, such as a vehicle modem of the TCU 120-A (which may not be present in some configurations), a global positioning system (GPS) module 120-B configured to provide current vehicle 102 location and heading information, and various other vehicle ECUs configured to cooperate with the VCS 106. As some non-limiting possibilities, the vehicle ECUs may include a powertrain control module (PCM) 120-C configured to provide control of engine operating components (e.g., idle control components, fuel delivery components, emissions control components, etc.) and monitoring of engine operating components (e.g., status of engine diagnostic codes); a body control module (BCM) 120-D configured to manage various power control functions such as exterior lighting, interior lighting, keyless entry, remote start, and point of access status verification (e.g., closure status of the hood, doors and/or trunk of the vehicle 102); a radio transceiver module (RCM) 120-E configured to communicate with key fobs or other local vehicle 102 devices; a climate control management (CCM) 120-F module configured to provide control and monitoring of heating and cooling system components (e.g., compressor clutch and blower fan control, temperature sensor information, etc.); and a battery control module (BACM) 120-G configured to monitor the state of charge or other parameters of the battery of the vehicle 102.

The wide-area network 152 may include one or more interconnected communication networks such as the Internet, a cable television distribution network, a satellite link network, a local area network, a wide area network, and a telephone network, as some non-limiting examples. Using an embedded modem 116 of the VCS 106, the vehicle 102 may be able to send outgoing data from the vehicle 102 to network destinations on the wide-area network 152, and receive incoming data to the vehicle 102 from network destinations on the wide-area network 152. The vehicle may also send and receive data from the V2V modem 122 or the WPAN modem 116. It should be appreciated that any of the communicated information disclosed herein may be provided by any combination of processors located internally or externally with respect to the vehicle and transmitted using any combination of networking protocols. The processing may be distributed throughout vehicles 102 in the vicinity of the event or performed on a backend server 150. The vehicle 102 may include various communication mediums and methods to distribute vehicle path information among all vehicles, autonomous and non-autonomous, affected by the event. For example, the vehicles 102 may form an ad-hoc, distributed network to distribute processing of the gesture or path information. The vehicles 102 may form a distributed network to communicate detour instructions and travel paths among one another. The vehicles 102 may cooperatively determine rejection rates or altered travel paths.

The TCU 120-A may include a cellular modem or other network transceiver configured to facilitate communication over the wide-area network 152 between the vehicle 102 and other devices of the system. In an example, the VCS 106 may be configured to access the communications features of the TCU 120-A by communicating with the TCU 120-A over a vehicle bus 112. As some examples, the vehicle Bus® may include a controller area network (CAN) bus, an Ethernet bus, or a MOST bus. In other examples, the VCS 106 may access the wide-area network 152 using the communications services of the mobile device. In an example, the VCS 106 may communicate with the mobile device over a local area connect (e.g., BLUETOOTH), and the mobile device, in turn, communicates over the wide-area network 152 using a cellular modem of the mobile device.

Figure 2:
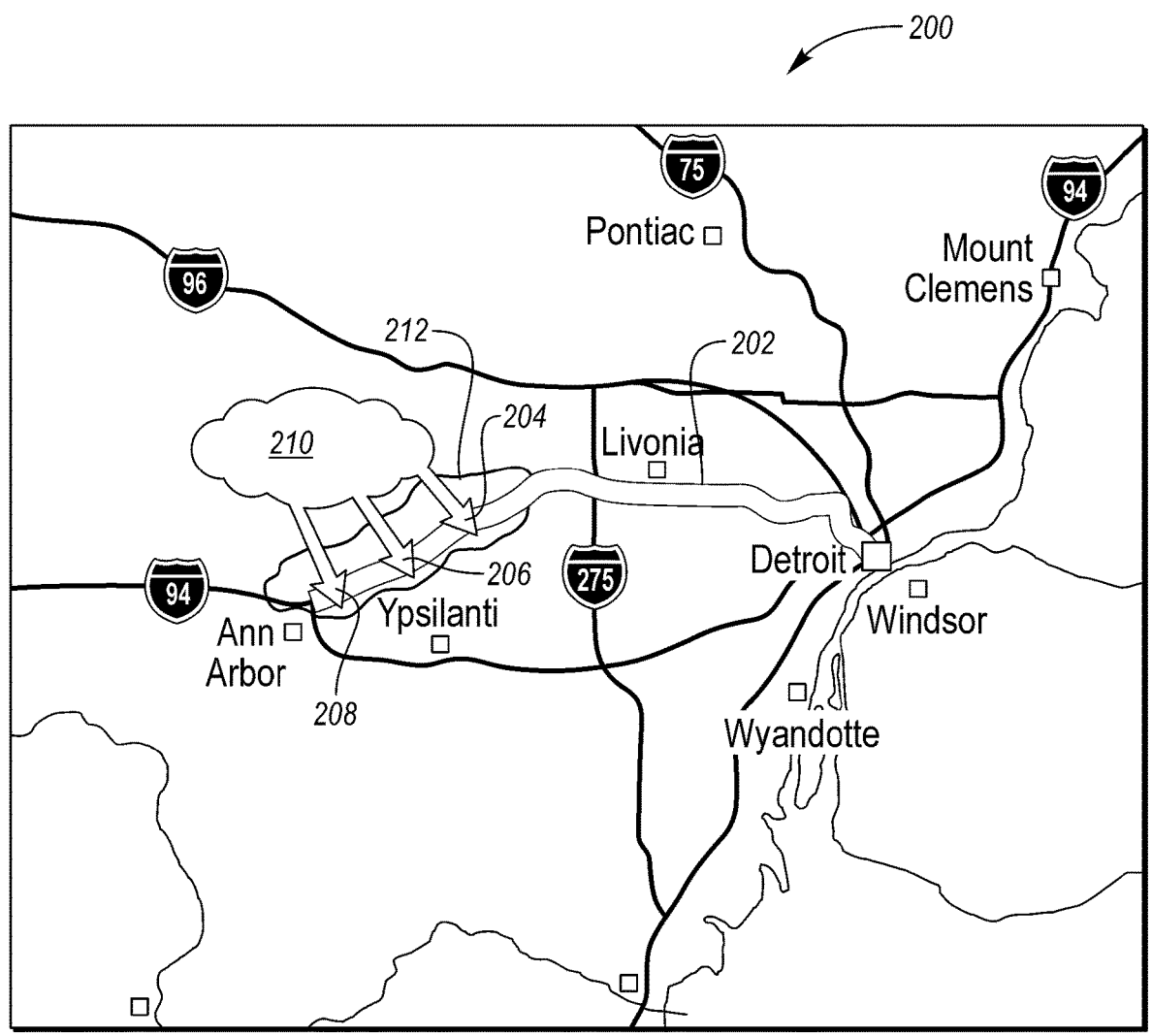
FIG. 2 is a display of a navigation system.

Referring to FIG. 2, a vehicle display screen 110 is shown. The vehicle display may be part of the HMI controls 108 or a separate device. The display shows an expected route 202 of a vehicle from Detroit, Mich. to Ann Arbor, Mich. The weather prediction vectors, 204, 206, 208 are anticipated to cross the expected route 202. The weather prediction vectors 204, 206, 208 are associated with a weather pattern 210. The weather prediction vectors 204, 206, 208 may be expected to make a precipitous deposit 212. The precipitous deposit may define a weather prediction perimeter. The precipitous deposit 212 may be divided into specific sections for each of the prediction vectors 204, 206, 208. For example, each vector may have a separate time component for the crossing. The time component may be associated with the expected deposit 212. Each vector may have an expected deposit 212 component that defines the amount of deposit expected. For example, the deposit between the vectors may vary.

Figure 3:
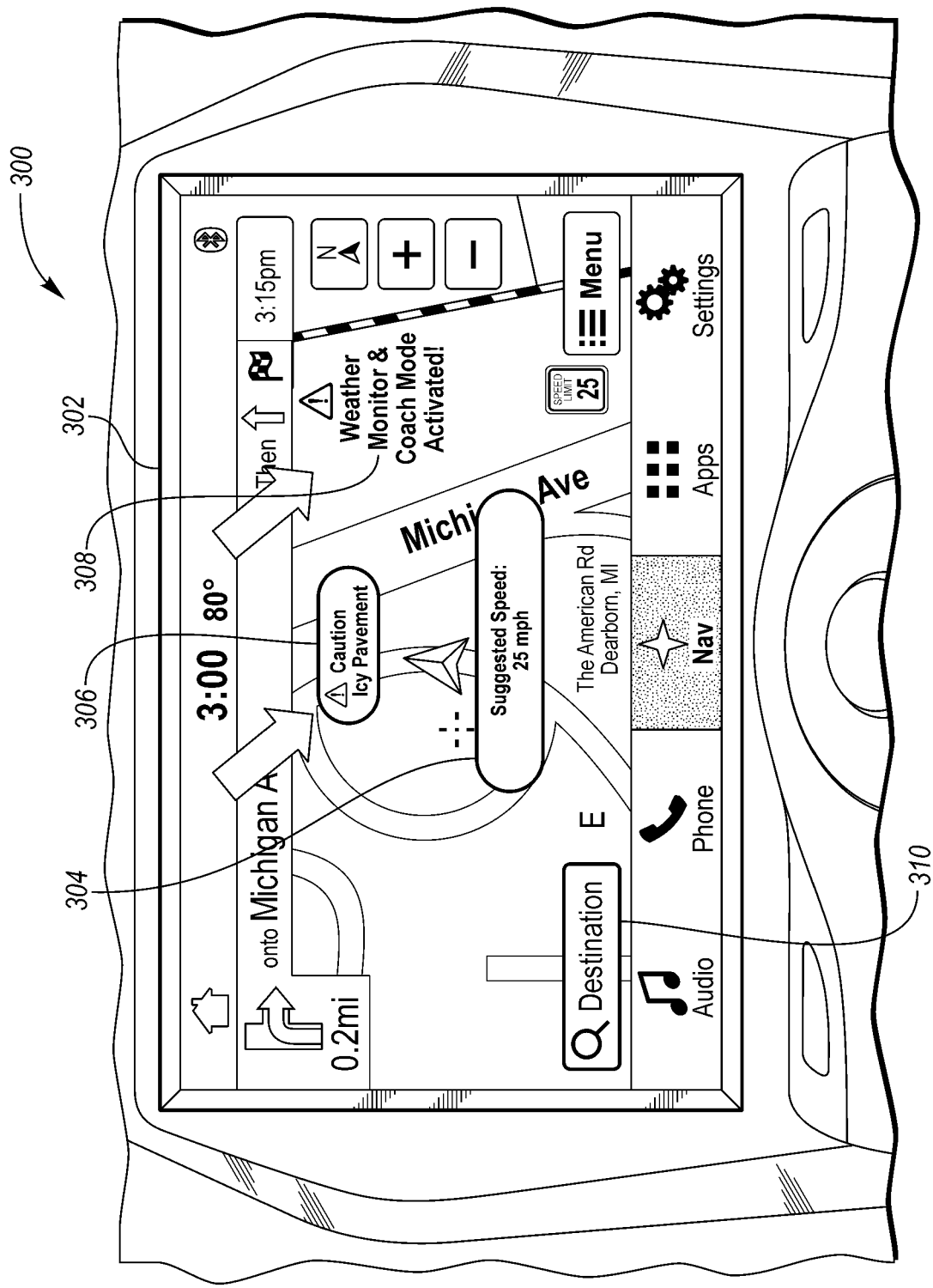
FIG. 3 is a display of a navigation system on a dashboard of a vehicle.

Referring to FIG. 3, a dashboard 300 of a vehicle is shown. The dashboard 300 includes a display 112. The display 112 notifies the passengers that at least one of the weather prediction vectors 204, 206, 208 have crossed the expected route 202. The passengers may be notified with a cautionary indicator 306. The passenger may be given a suggested speed indicator 304 as shown. The display 112 may include indication 308 that the weather coaching mode has been activated. The display 112 may further include expected route 202 planning icons 310.

Figure 4:
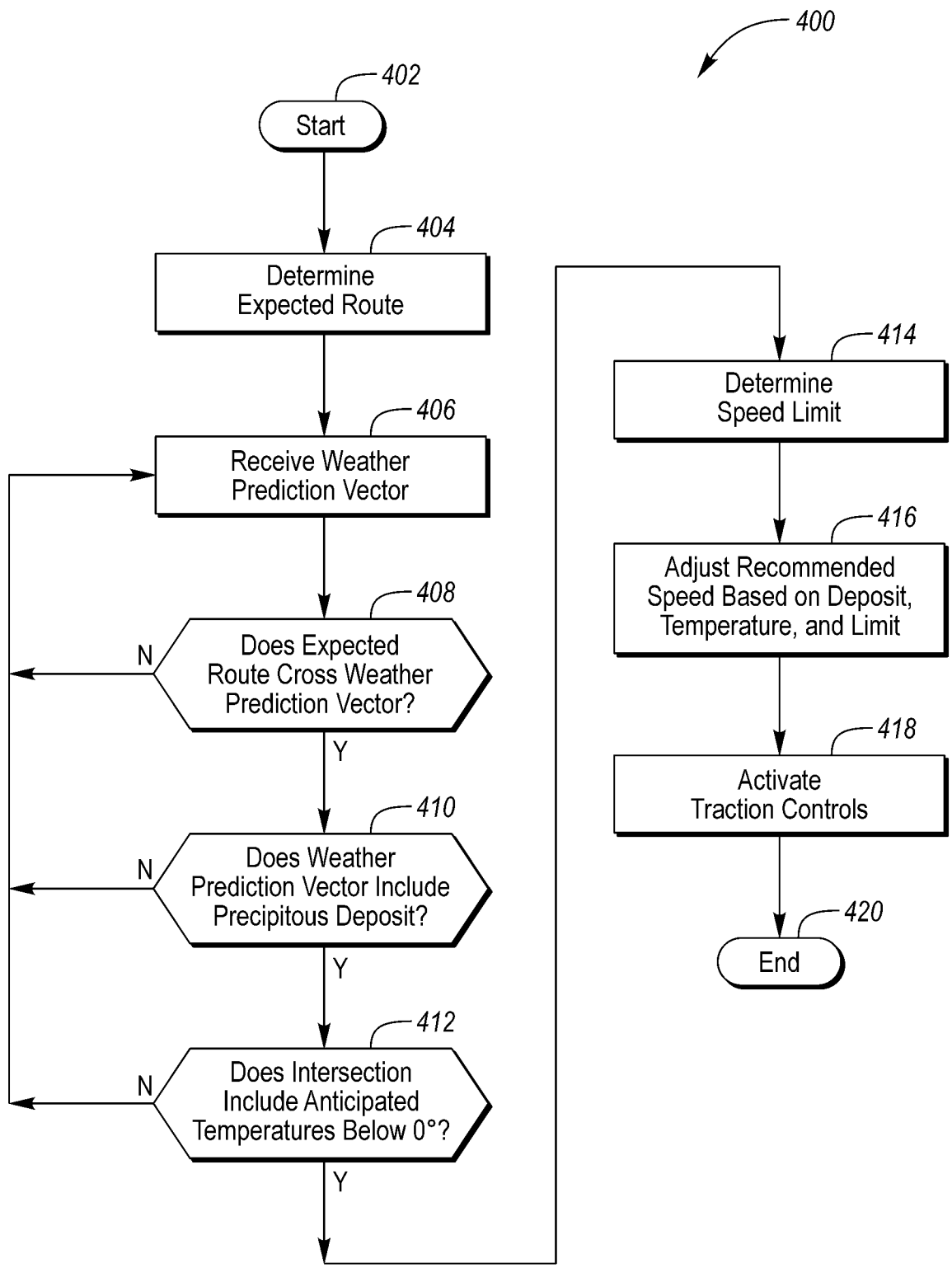
FIG. 4 is an algorithm for displaying a speed recommendation and activation of traction controls.

Referring to FIG. 4, an algorithm 400 for performing the teachings of this disclosure. The steps of the algorithm 400 may be performed in any sequence and some of the steps may be omitted. The algorithm 400 starts in step 402. In step 404, the expected route 202 is determined. The expected route 202 may be determined by user input through the display 112 and icon 310. The expected route 202 may be determined by an autonomous source onboard or offboard the vehicle. The algorithm 400 may be performed onboard or offboard the vehicle and instructions to the vehicle may be provided. For example, the server 150 may perform all the calculations required and send the results to the vehicle 102.

In step 406, a weather prediction vector 204, 206, 208 is received. The vehicle or server may determine whether the expected route 202 crosses the weather prediction vector 204, 206, 208. If the paths cross, the controller may determine whether the weather prediction vector includes a precipitous deposit 212 that will be deposited along the route 202. For example, rain may be deposited along the route 202, requiring a reduced speed and heightened attention from a driver or vehicle. Additionally, traction or stability controls may be engaged at the cost of fuel economy or other necessities. In step 412, the controller may determine whether the intersection includes anticipated temperatures below 0° C. If the intersection includes such temperatures, the controller may further lower the suggested speeds to account for the lower coefficient of friction related to ice, sleet, snow, or a mixture thereof. In step 414 the controller may receive a posted speed limit from a national or local repository. For example, the highway speed limit from Detroit, Mich. to Ann Arbor, Mich. may be between 55 and 70 mph.

The controller may further activate traction controls or other ancillary systems to ensure vehicle control is available before and during the crossing. For example, the ancillary systems may take a period of time to engage. The ancillary systems may be activated with enough lead time to ensure those systems are properly engaged before the crossing.

The suggested speed may be a function of numerous variables (e.g., speed limit, temperature, amount of deposit, visibility, time, traffic, traffic lanes). For example, the speed limit may serve as a starting point. Based on the crossing or intersection, meaning any precipitation, the suggested speed may be a reduction of the posted speed limit by 50%. Any additional factors (e.g., traffic, visibility, time, amount of deposit) may further reduce the speed suggested by 50% or another amount tailored to the specific factor.

The expected route may be defined by an algorithmically determined route based on a selected destination. The user or controller may select a destination. An algorithm may be used to determine the shortest route for the destination. The expected route may be a portion of the algorithmically determined route. The vector may include a visibility distance. The visibility distance may also be determined by LiDar or other implements. The suggested speed may be based on the visibility distance. For example, the speed may be reduced if visibility drops below a predetermined threshold (e.g., 1 mile).

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a traction control system;
a display; and
a controller configured to, responsive to an expected route of the vehicle crossing an expected precipitous deposit of a weather prediction vector received from a source offboard the vehicle, indicate on the display a recommended speed based on the deposit and a temperature associated with the deposit, and a speed limit associated with the route, and activate the traction control system before the vehicle crosses the vector, wherein the expected precipitous deposit is below a predetermined temperature.

2. The vehicle of claim 1, wherein the expected precipitous deposit is an accumulation of snow above a predetermined snow threshold.

3. The vehicle of claim 1, wherein the expected precipitous deposit is an accumulation of ice above a predetermined ice threshold.

4. The vehicle of claim 1, wherein the expected precipitous deposit is an accumulation of ice and snow above a predetermined ice, snow threshold.

5. The vehicle of claim 1, wherein the expected route is defined by an algorithmically determined route based on a selected destination.

6. The vehicle of claim 1, wherein the vector includes a visibility distance.

7. The vehicle of claim 6, wherein the speed is further based on the visibility distance.

8. The vehicle of claim 6, wherein the controller is further configured to, responsive to visibility falling blow a visibility threshold and the expected precipitous deposit being snow, activate stability controls.

9. The vehicle of claim 1, wherein the speed has a local minimum when the temperature is within 10% of freezing.

10. A method comprising:
indicating on a display a recommended speed in response to receiving an expected precipitous deposit of a weather prediction vector from a source offboard the vehicle, the deposit including a temperature falling below a predetermined temperature, and an expected vehicle route crossing the deposit; and
activating a traction control system before the vehicle crosses the vector.

11. The method of claim 10, wherein the expected precipitous deposit includes an accumulation of snow above a predetermined snow threshold.

12. The method of claim 10, wherein the expected precipitous deposit includes an accumulation of ice above a predetermined ice threshold.

13. The method of claim 10, wherein the expected precipitous deposit includes an accumulation of ice and snow above a predetermined ice, snow threshold.

14. The method of claim 10, wherein the expected route is determined based on a selected destination.

15. The method of claim 10, wherein the vector includes a visibility distance.

16. The method of claim 15, wherein the speed is further based on the visibility distance.

* * * * *